(12) United States Patent
Lin et al.

(10) Patent No.: US 11,030,379 B2
(45) Date of Patent: Jun. 8, 2021

(54) METHOD FOR INTEGRATED CIRCUIT LAYOUT

(71) Applicant: REALTEK SEMICONDUCTOR CORPORATION, Hsinchu (TW)

(72) Inventors: Tien-Kuo Lin, Taichung (TW); Li-Yi Lin, Changhua County (TW); Yun-Chih Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/941,952

(22) Filed: Jul. 29, 2020

(65) Prior Publication Data

US 2021/0034808 A1 Feb. 4, 2021

(30) Foreign Application Priority Data

Jul. 30, 2019 (TW) ................ 108126897

(51) Int. Cl.
*G06F 30/396* (2020.01)
*G06F 30/398* (2020.01)
*G06F 30/392* (2020.01)
*G06F 115/06* (2020.01)

(52) U.S. Cl.
CPC .......... *G06F 30/396* (2020.01); *G06F 30/392* (2020.01); *G06F 30/398* (2020.01); *G06F 2115/06* (2020.01)

(58) Field of Classification Search
CPC .... G06F 30/396; G06F 30/392; G06F 30/398; G06F 2115/06; G06F 30/367
See application file for complete search history.

(56) References Cited

U.S. PATENT DOCUMENTS

| | | | | |
|---|---|---|---|---|
| 6,971,074 B2* | 11/2005 | Hasegawa | ............... | G06F 30/39 716/120 |
| 7,155,686 B2 | 12/2006 | Hou et al. | | |
| 8,099,692 B1* | 1/2012 | Kretchmer | ............ | G06F 30/392 716/100 |
| 8,291,361 B2* | 10/2012 | Higashi | .................. | G06F 30/39 716/104 |
| 9,424,384 B2* | 8/2016 | Yang | ....................... | H01L 23/66 |
| 2004/0054979 A1* | 3/2004 | Bobba | .................. | G06F 30/367 716/111 |

(Continued)

FOREIGN PATENT DOCUMENTS

TW 200712962 A 4/2007

OTHER PUBLICATIONS

Taiwan Intellectual Property Office, Office Action letter of the counterpart TW application (appl. No. 108126897) dated Apr. 29, 2020. English summary on p. 1.

*Primary Examiner* — Stacy Whitmore
(74) *Attorney, Agent, or Firm* — WPAT, PC

(57) ABSTRACT

Disclosed is an integrated circuit (IC) layout method capable of reducing an IR drop as a result of an IC layout process. The method includes the following steps: performing the IC layout process and obtaining an original IC layout; performing an IR drop analysis on the original IC layout and identifying an IR drop hot zone; determining a circuit density limit of the IR drop hot zone; and performing the IC layout process again according to the circuit density limit and obtaining an updated IC layout.

7 Claims, 3 Drawing Sheets

(56) References Cited

U.S. PATENT DOCUMENTS

| | | | |
|---|---|---|---|
| 2004/0073878 A1* | 4/2004 | Hasegawa | G06F 30/39 |
| | | | 716/120 |
| 2008/0148199 A1* | 6/2008 | Bell | G06F 30/367 |
| | | | 716/112 |
| 2009/0031264 A1* | 1/2009 | Rittman | G06F 30/398 |
| | | | 716/106 |
| 2010/0064272 A1* | 3/2010 | Higashi | G06F 30/39 |
| | | | 716/122 |
| 2015/0370946 A1* | 12/2015 | Yang | H01L 23/66 |
| | | | 257/532 |
| 2020/0134121 A1* | 4/2020 | Lin | G06F 30/396 |

* cited by examiner

METHOD FOR INTEGRATED CIRCUIT LAYOUT

BACKGROUND OF THE INVENTION

1. Field of the Invention

The present disclosure relates to a method for circuit layout, especially to a method for integrated circuit layout.

2. Description of Related Art

Regarding the design process of an integrated circuit (an integrated circuit (IC) such as an application-specific integrated circuit (ASIC)), a designer usually performs an IR drop verifying process to the design of the IC that has passed a timing closure procedure before tape-out so as to make sure that the performance of the IC can be stable or prevent overheating of the internal circuitry of the IC. IR drop is the electrical potential difference between the two ends of a conducting phase during a current flow. This voltage drop across any resistance is the product of current (I) passing through resistance and resistance value (R). In order to prevent the IR drop problem caused by the layout of some circuits (e.g., standards cells which have a large size, strong driving force, and concentrated distribution, or standard cells which have less driving force and are driven by some specific signal pattern), the designer can manually adjust the positions of the circuits or perform a size-down procedure on the circuits after the design of the IC passed the timing closure procedure. This adds dispersion to those circuits and reduces the IR drop of an IR drop hot zone, relieving the IR drop problem.

However, manually adjusting the positions of circuits may affect the reliability of the timing closure procedure and/or cause a power leakage problem. In order to tackle the above-mentioned problems, a redesigning process of the circuitry is necessary. However, the redesigning process may not only cause the circuit area or the leakage power to increase but will delay the schedule of the circuit tape-out. In addition, manually adjusting the positions of circuits will consume much of engineers' time, with no guarantee of result.

SUMMARY OF THE INVENTION

An object of the present disclosure is to provide a method for integrated circuit (IC) layout. This method can prevent the problem of the prior art.

Another object of the present disclosure is to provide a method for IC layout. This method can improve an electrical characteristic as a result of an IC layout process, reduce manual procedures, and improve and accelerate the IC layout process.

An embodiment of the method of the present disclosure can reduce an IR drop as a result of an IC layout process. This embodiment includes the following steps: performing the IC layout process and thereby obtaining an original IC layout; performing an IR drop analysis on the original IC layout and thereby identifying an IR drop hot zone of the original IC layout; determining a circuit density limit of the IR drop hot zone; and performing the IC layout process again according to the circuit density limit and thereby obtaining an updated IC layout.

Another embodiment of the method of the present disclosure can improve an electrical characteristic as a result of an IC layout process. This embodiment includes the following steps: performing the IC layout process and thereby obtaining an original IC layout; performing a circuit characteristic analysis on the original IC layout and thereby identifying a warning hot zone of the original IC layout; determining a circuit density limit of the warning hot zone; and performing the IC layout process again according to the circuit density limit and thereby obtaining an updated IC layout.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this technical field. If any term is defined in the following description, such term should be interpreted accordingly.

The present disclosure discloses a method for integrated circuit (IC) layout. This method can improve an electrical characteristic as a result of an IC layout process, reduce manual procedures, and improve and accelerate the IC layout process. The method is applicable to a design process of an application-specific integrated circuit (ASIC) or other kinds of ICs, especially to a design process of an IC (e.g., a high speed and low power IC) sensitive to an IR drop (i.e., a voltage drop that appears at a resistive component of any impedance); however, the application of the method is not limited thereto.

Figure 1:
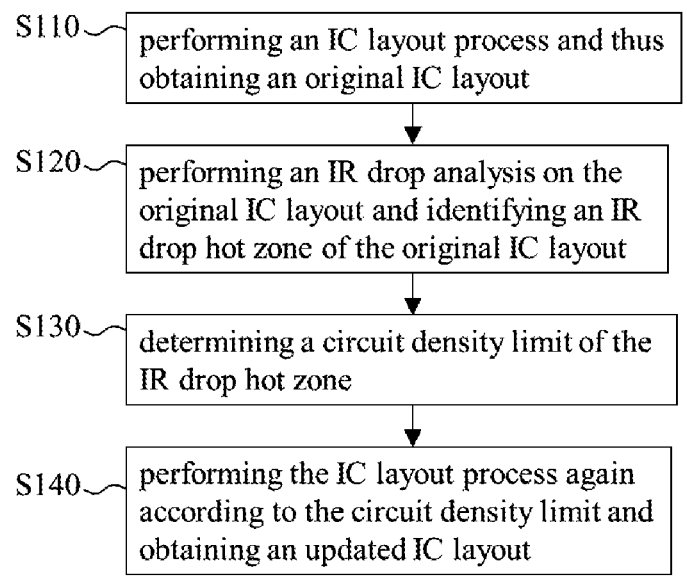
FIG. 1 shows an embodiment of the IC layout method of the present disclosure.
Figure 2:
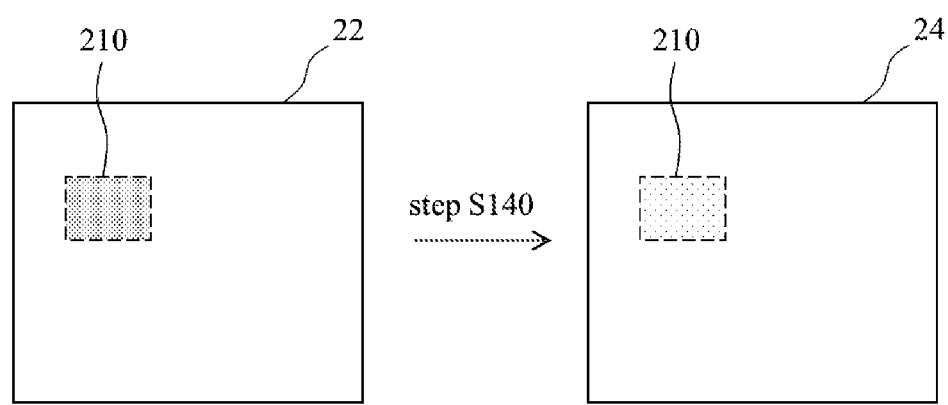
FIG. 2 illustrates the effect of the IC layout method of FIG. 1.

FIG. 1 shows an embodiment of the IC layout method of the present disclosure. This embodiment can reduce an IR drop as a result of an IC layout process, and includes the following steps:

step S110: performing the IC layout process and thereby obtaining an original IC layout. In an exemplary implementation, the IC layout process is a general/self-developed IC layout process carried out before an IR drop analysis, and includes the following procedures in sequence: a placement procedure used to perform a layout process according to a gate level netlist; a clock tree synthesis (CTS) procedure used to perform a CTS process according to the result of the placement procedure; a post-CTS procedure used to perform adjustment on the result of the CTS procedure according to design rules, a setup and hold requirement, an area and power optimizing requirement, a congestion reduction requirement, and so on; a route procedure; a post-route procedure; and a threshold voltage swap (VT swap) procedure used to adopt devices of proper threshold voltages good for the timing closure of a critical path, the reduction of leakage power of non-critical paths, and so on. The above-mentioned placement procedure, CTS procedure, post-CTS procedure, route procedure, post-route procedure, and VT swap procedure can be known or self-developed procedures in this technical field, and thus their detail is omitted here. Step S110 can be executed with a known utility program (e.g., ICC/ICC2 of Synopsys, or Innovus of Cadence).

step S120: performing a known or self-developed IR drop analysis on the original IC layout and thereby identifying an IR drop hot zone of the original IC layout. In an exemplary implementation, step S120 performs the IR drop analysis to find out a plurality of IR drop hot zones. Step S120 can be executed with a known utility program (e.g., RedHawk of ANSYS).

step S130: determining a circuit density limit of the IR drop hot zone. In an exemplary implementation, step S130 determines a plurality of circuit density limits for a plurality of IR drop hot zones of the original IC layout respectively, wherein any two of the circuit density limits are the same or different and the plurality of IR drop hot zones are identified by step S120. In an exemplary implementation, step S130 includes: measuring the utilization rate (e.g., x %) (i.e., the circuit density) of the IR drop hot zone according to the original IC layout after the placement procedure and before the CTS procedure; and reducing the circuit density of the IR drop hot zone of the original IC layout to obtain the circuit density limit (e.g., (x−i) % or (xxk) %, in which the variable "i" is a predetermined value and the variable "k" is a predetermined ratio). It should be noted that the way to measure the circuit density of the IR drop hot zone can be known or self-developed, and thus its detail is omitted here.

step S140: performing the IC layout process again according to the circuit density limit and thereby obtaining an updated IC layout. Compared with the circuit density of the IR drop hot zone of the original IC layout, the circuit density of the IR drop hot zone is reduced when re-performing the IC layout process according to the circuit density limit and consequently the IR drop is reduced as a result of the IC layout process. In an exemplary implementation, the circuit density limit is reduced one time or several times in step S140; therefore, if the circuit components (e.g., buffer components) that are added in the aforementioned CTS procedure and post-CTS procedure are not taken into consideration, the circuit density of the IR drop hot zone of the original IC layout (e.g., the IR drop hot zone 210 of the original IC layout 22 in FIG. 2) will be higher than the circuit density of the IR drop hot zone of the updated IC layout (e.g., the IR drop hot zone 210 of the updated IC layout 24 of FIG. 2) as illustrated in FIG. 2. However, if the circuit components added in the CTS procedure and post-CTS procedure are taken into consideration, the circuit density of the IR drop hot zone of the original IC layout could be higher or lower than the circuit density of the IR drop hot zone of the updated IC layout.

Please refer to FIG. 1. In an exemplary implementation, the IC layout process includes a placement procedure, a CTS procedure, and M remaining procedure(s) (e.g., at least one of the aforementioned post-CTS procedure, route procedure, post-route procedure, and VT swap procedure) in sequence, wherein M is a positive integer; in this exemplary implementation, step S140 includes: reducing the circuit density limit after the placement procedure and before the CTS procedure; and then performing the CTS procedure and the M remaining procedure(s) to obtain the updated IC layout. The above-mentioned step of reducing the circuit density limit can remove the circuit density limit completely or relax the circuit density limit; for example, the circuit density of the IR drop hot zone is no longer restricted to the circuit density limit after the placement procedure, but it may be restricted to other limits of the IC layout process that are beyond the discussion of the present invention.

Please refer to FIG. 1. In an exemplary implementation, the IC layout process includes N procedures (e.g., the aforementioned placement procedure and CTS procedure, and at least one of the aforementioned post-CTS procedure, route procedure, post-route procedure, and VT swap procedure), wherein the N is an integer greater than two; in this implementation, step S140 includes: reducing the circuit density limit several times during the course of performing the N procedures of the IC layout process, and thereby obtaining the updated IC layout. The above-mentioned step of reducing the circuit density limit several times can remove the circuit density limit completely or relax the circuit density limit.

Figure 3:
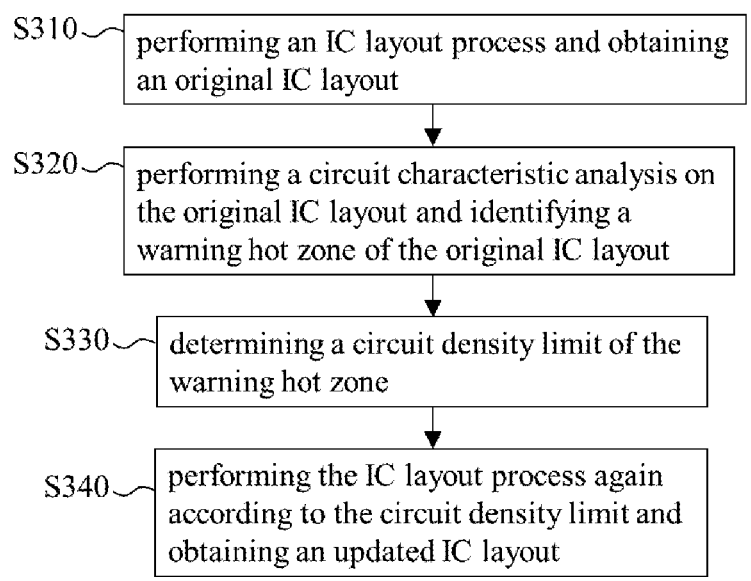
FIG. 3 shows another embodiment of the IC layout method of the present disclosure.

FIG. 3 shows another embodiment of the IC layout method of the present disclosure. This embodiment can improve an electrical characteristic (e.g., an electrical characteristic except the aforementioned IR drop characteristic) as a result of an IC layout process, and includes the following steps:

step S310: performing the IC layout process and thereby obtaining an original IC layout.

step S320: performing a circuit characteristic analysis on the original IC layout and thereby identifying a warning hot zone of the original IC layout.

step S330: determining a circuit density limit of the warning hot zone.

step S340: performing the IC layout process again according to the circuit density limit and thereby obtaining an updated IC layout.

Since those of ordinary skill in the art can refer to the disclosure of the embodiment of FIG. 1 to appreciate the detail and modification of the embodiment of FIG. 3, which implies that some or all of the features of the embodiment of FIG. 1 can be applied to the embodiment of FIG. 3 in a reasonable way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly.

To sum up, the method of the present disclosure can improve an electrical characteristic (e.g., an IR drop characteristic) as a result of an IC layout process, reduce manual procedures, and improve and accelerate the IC layout process.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method for integrated circuit (IC) layout, the method comprising:

performing an IC layout process and obtaining an original IC layout;

performing an IR drop analysis on the original IC layout and identifying an IR drop hot zone of the original IC layout;

determining a circuit density limit of the IR drop hot zone; and performing the IC layout process again according to the circuit density limit and obtaining an updated IC layout, whereby an IR drop is reduced as a result of the IC layout process, wherein the step of determining the circuit density limit of the IR drop hot zone includes determining the circuit density limit of the IR drop hot zone according to a circuit density of the IR drop hot zone of the original IC layout, the IC layout process includes a placement procedure and a clock tree synthesis (CTS) procedure in sequence, and the step of determining the circuit density limit of the IR drop hot zone further includes:

measuring the circuit density of the IR drop hot zone according to the original IC layout after the placement procedure and before the CTS procedure; and reducing the circuit density of the IR drop hot zone of the original IC layout to determine the circuit density limit of the IR drop hot zone.

2. The method of claim 1, wherein the step of reducing the circuit density of the IR drop hot zone of the original IC layout includes: subtracting a predetermined value from a value of the circuit density of the IR drop hot zone of the original IC layout, or multiplying the value of the circuit density of the IR drop hot zone of the original IC layout by a predetermined ratio.

3. The method of claim 1, wherein the IC layout process includes N procedures in sequence, the N is an integer greater than two, and the step of performing the IC layout process again according to the circuit density limit and obtaining the updated IC layout includes:

reducing the circuit density limit several times during execution of the N procedures of the IC layout process, and obtaining the updated IC layout.

4. The method of claim 3, wherein after reducing the circuit density limit of the IR drop hot zone several times, the circuit density limit is removed completely.

5. The method of claim 1, wherein a circuit density of the IR drop hot zone of the original IC layout is higher than the circuit density of the IR drop hot zone of the updated IC layout.

6. A method for integrated circuit (IC) layout, the method comprising:

performing an IC layout process and obtaining an original IC layout;

performing an IR drop analysis on the original IC layout and identifying an IR drop hot zone of the original IC layout;

determining a circuit density limit of the IR drop hot zone; and performing the IC layout process again according to the circuit density limit and obtaining an updated IC layout, whereby an IR drop is reduced as a result of the IC layout process, wherein the IC layout process includes a placement procedure, a clock tree synthesis (CTS) procedure, and M remaining procedure(s) in sequence, the M is a positive integer, the M remaining procedure(s) include(s) at least one of a post-CTS procedure, a route procedure, a post-route procedure, and a threshold voltage swap procedure, and the step of performing the IC layout process again according to the circuit density limit and obtaining the updated IC layout includes:

after determining the circuit density limit, reducing the circuit density limit between the placement procedure and the CTS procedure, and then performing the CTS procedure and the M remaining procedure(s) to obtain the updated IC layout.

7. The method of claim 6, wherein the step of reducing the circuit density limit is removing the circuit density limit completely.

* * * * *